Aug. 14, 1951     H. P. KUEHNI     2,564,484
ELECTRICAL TORQUEMETER
Filed Oct. 15, 1947
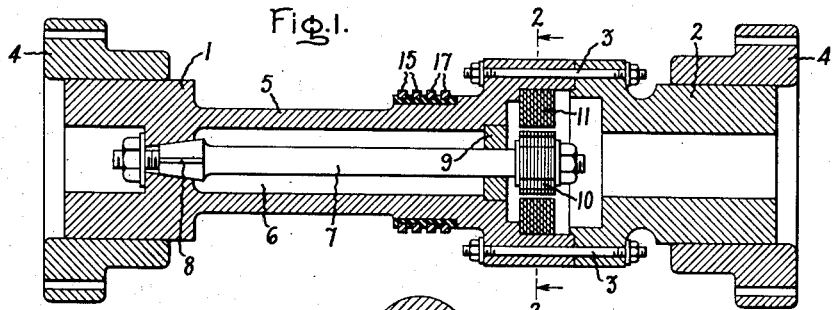
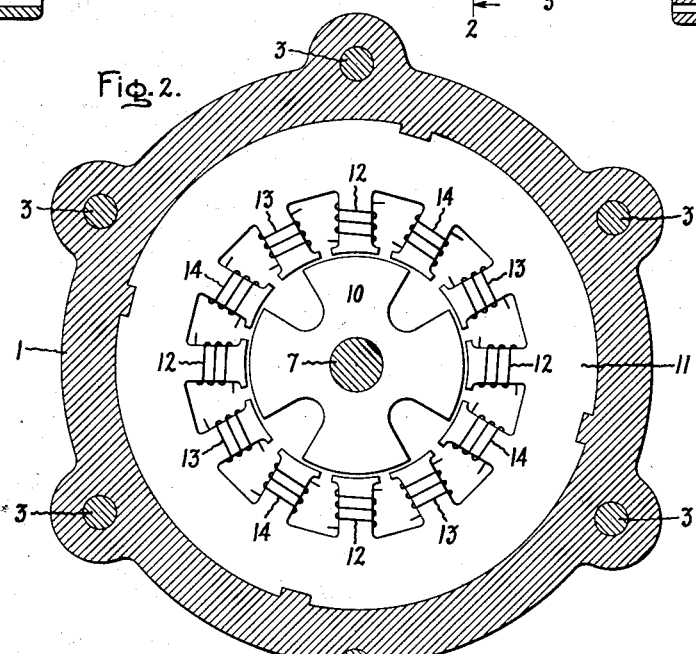
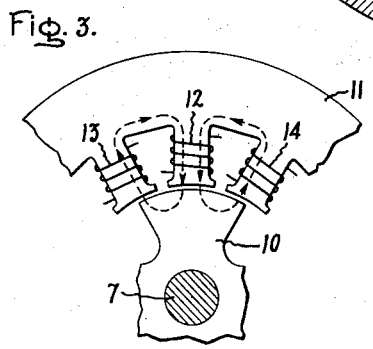
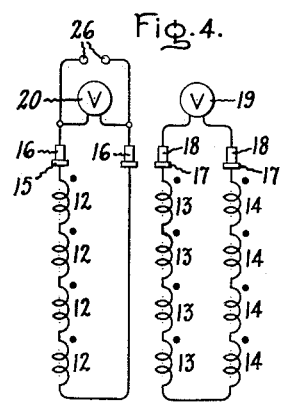
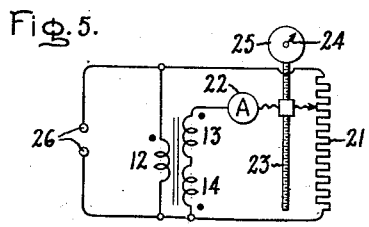
Inventor:
Hans P. Kuehni,
by Crowell S. Mack
His Attorney.

Patented Aug. 14, 1951

2,564,484

UNITED STATES PATENT OFFICE 2,564,484

ELECTRICAL TORQUE METER

Hans P. Kuehni, Schenectady, N. Y., assignor to General Electric Company, a corporation of New York Application October 15, 1947, Serial No. 780,089

1 Claim. (Cl. 73—136)

My invention relates to improvements in torquemeters and more particularly to torquemeters adapted for use on high-speed rotating shafts.

It is an object of my invention to provide an improved torquemeter for electrically measuring the torsional force transmitted by a rotating shaft.

It is another object of my invention to provide an improved torquemeter having its gaging parts near the axis of rotation and radially symmetrical thereto, to minimize centrifugal force design and operating difficulties.

It is another object of my invention to provide an improved means for electrically measuring the torsional force in a rotating shaft transmitting a large amount of mechanical power at a high speed of rotation.

It is a further object of my invention to provide an improved means for electrically measuring the torsional force in a rotating shaft in which incidental small relative lateral displacements of the gaging elements will have negligible effect on the torque reading.

The features of my invention which are believed to be novel and patentable will be pointed out in the claim appended hereto. For a better understanding of my invention reference is made in the following description to the accompanying drawing, in which Fig. 1, representing a preferred form of my invention, is a vertical section of the torquemeter shaft unit in a plane containing the axis of rotation; Fig. 2 is a section perpendicular to the axis of rotation on the line 2—2 of Fig. 1, showing the detailed construction of the rotor and stator elements; Fig. 3 is a fragment of the section shown in Fig. 2 showing one group of rotor and stator pole pieces and their magnetic flux linkages; Fig. 4 is a circuit diagram showing the electrical circuits in one form of my invention, and Fig. 5 is a circuit diagram showing an alternate type of electrical measuring apparatus which may be used with my invention. Dots opposite coil ends indicate points of like polarity. Similar reference characters represent similar parts throughout the drawing.

Referring now to Fig. 1, a preferred embodiment of my torquemeter has two major shaft unit sections 1 and 2 held together by bolts 3, as shown. The ends of the shaft unit receive couplings 4 for coupling the shaft unit into a rotating shaft transmission. Alternatively, the torque may be transmitted by gears attached to respective ends of the shaft unit, which may then be supported by suitable bearings. The left-hand section 1 has an undercut portion 5 which is designed to twist within safe torsional stress limits by an amount proportional to the torque transmitted. The part 5 comprises an integral longitudinally extending torque-transmitting portion of reduced cross-sectional area within which the greater part of the twist of the torque-transmitting shaft occurs. An axial bore 6 in the shaft unit receives a reference pin 7 which is located on the rotation axis. On the left-hand end this pin is held securely by a taper and key arrangement 8 and on the right-hand end the pin is preferably supported within the bore of the shaft unit by a sleeve bearing 9. This reference pin does not transmit any torque but is merely used to transfer the twist position of the left-hand end of the shaft unit to the location where the shaft twist is measured. A magnetic rotor 10 is securely fastened to the right-hand end of the reference pin, and a magnetic stator 11 is securely fastened to the shaft unit in the position shown, so that the magnetic rotor and stator elements are in cooperative flux linking relation and are adapted to be rotated relative to each other by any twisting of the shaft unit. With this arrangement complete radial symmetry is obtained and the gaging parts are as close as possible to the center of rotation where the centrifugal forces are smallest, thus effectively preventing distortions which would result in inaccuracies. The gaging elements 10 and 11 are readily accessible for inspection and maintenance when shaft unit section 1 is uncoupled from section 2 by removing bolts 3.

An important feature of this construction is that a definite gauge length along the shaft is provided by the undercut portion within which most of the shaft twist occurs. Both the connections for applying torsional force to the shaft and the gauge connections for detecting twist of the shaft are beyond the extremities of the undercut portion, as shown in the drawing, so that the effective gauge length is constant and freedom from mechanical hysteresis is obtained to an unusual degree. If desired, to further reduce mechanical hysteresis due to possible slipping under stress at the gauge connections, the inner shaft portions to which the gauge connections are made may be relieved of stress by cutting annular grooves between such inner portions and the main body of the shaft unit.

The magnetic stator 11 is provided with a plurality of salient pole pieces in groups of three, each wound with a coil, as shown in Fig. 2. Coils 12 are primary coils which are energized, as hereinafter explained, from a source of alternating electric power. Coils 13 and 14 are secondary coils in which voltages are induced by magnetic flux linkage with the primary coils 12.

The magnetic rotor 10 is provided with a plurality of salient pole pieces as shown, one for each group of three pole pieces on the stator. In Fig. 2 the rotor is shown in the no-torque position, in which position each rotor pole piece symmetrically covers the entire area adjacent a stator pole piece bearing a primary coil 12, one half the area adjacent a stator pole piece bearing a secondary coil 13, and one half the area adjacent a stator pole piece bearing a secondary coil 14.

Fig. 3 is a fragment of Fig. 2, showing one group of rotor and stator pole pieces and their magnetic flux linkages. The flux paths are indicated in the figure by broken lines and their relative directions by arrows. Each group of pole pieces operate as follows: The primary coil 12 produces a magnetic flux which traverses the pole piece of coil 12, crosses an air gap into the rotor, and there divides into two parts. One part of the magnetic flux crosses an air gap and returns through the pole piece of coil 13 and the other part crosses an air gap and returns through the pole piece of coil 14. When the rotor is in the no-torque position, as shown, an equal amount of the magnetic flux will return by each of the paths described above, and equal voltages will be induced in coils 13 and 14. If the rotor is rotated relative to the stator through a small clockwise angle away from the no-torque position, the area of the rotor which overlaps the pole piece of coil 14 will exceed the area of the rotor which overlaps the pole piece of coil 13; and as a consequence a larger proportion of the magnetic flux will return through the pole piece of coil 14 than will return through the pole piece of coil 13, which will cause a larger voltage to be induced in coil 14 than will be induced in coil 13. In like manner, if the rotor is rotated counterclockwise through a small angle a larger voltage will be induced in coil 13 than is induced in coil 14. Thus the amount of inequality between the voltage induced in coil 13 and the voltage induced in coil 14 is a measure of the amount of angular displacement of the rotor relative to the stator away from the no-torque position. It is desirable to design the primary coils 12 to have a high "Q," so that the total magnetic flux produced will be substantially independent of changes in the reluctance of the magnetic path.

Referring now to Fig. 4, which is a circuit diagram of the electrical circuits in one form of my invention, I prefer to connect all coils 12 in series, as shown, but a parallel connection or a series-parallel connection will also give good results. I energize these coils preferably from a source of 2000-cycle electric power which will provide a voltage across each primary coil of approximately 10 volts. This power source may be connected to the coils through terminals 26, brushes 16, and slip rings 15, as shown. A voltmeter 20 is provided so that the exact value of the energizing voltage may be determined. I preferably connect all coils 13 in series to add their voltages, and likewise connect all coils 14 in series to add their voltages, except that the polarities of coils 14 are reversed with respect to the polarities of coils 13. If all the secondary coils are now connected in series in this fashion, as is shown in Fig. 4, the net voltage as measured at the end terminals will be zero in the no-torque position of the rotor, and in any other rotor position the net voltage will be proportional to the amount of rotation of the rotor away from the no-torque position. This net voltage can be measured by a rectifying voltmeter 19, which may be connected to secondary coils 13 and 14 through slip rings 17 and brushes 18. If provision is made for supplying an energizing voltage of constant known magnitude to coils 12, voltmeter 19 may be calibrated to read torque directly in appropriate units.

An important advantage is obtained by connecting the secondary coils 13 and 14 as described above. Normally, the flux linkages in the pick-up coils are intended to be altered only by an angular displacement of the gage elements. However, these flux linkages are also altered by a lateral displacement of the rotor inside the stator, produced, for example, by bending of the pin carrying the rotor. Such displacement would increase the voltage induced in coils 13 and 14 on that side of the stator toward which the rotor is displaced, and would reduce the voltages induced in coils 13 and 14 on the directly opposite side of the stator. If the secondary coils are all connected in series as described above, the two voltage changes produced by the bending will have compensating effects. Bending can thus be made to have negligible effect on torque reading, if the bending displacement is not more than about 20% of the air gap dimension. In practice, this can be readily controlled. Since any variation in primary voltage, frequency, or wave form has the same effect upon the opposition voltages induced in coils 13 and 14, and since axial or radial displacements between stator and rotor will have equal influence on the opposed secondary voltages, the system is remarkably free of errors that might otherwise be caused by such variations.

Measurement of the net voltage induced in secondary coils 13 and 14 may be made by any convenient means, and is not restricted to the method shown in Fig. 4. In Fig. 5, I have shown another method of measuring this voltage using a bridge arrangement which makes the torque reading entirely independent of voltage, wave-form, and frequency variations in the source of alternating electric power. In this figure, to simplify the diagram I have represented all of the coils by one group of coils 12, 13 and 14 shown as a transformer. It will be understood that the coils are interconnected and operate in the manner hereinbefore explained. Referring to Fig. 5, alternating electric power applied through terminals 26 and the connections shown energizes coils 12 and provides an alternating voltage across the end terminals of a resistor 21 having a variable position tap. The combination of coils 13 and 14 in series with a galvanometer or ammeter 22 is connected between the variable tap and one end of resistor 21, as shown. To obtain a torque reading, the tap position of resistor 21 is adjusted, either manually or by automatic means, until no current flows through ammeter 22. When this balance is obtained, the torque being measured is proportional to the distance of the tap from the bottom end of resistor 21. A lead screw 23 may be provided to adjust the position of the adjustable tap, and may have a pointer 24 thereon cooperating with a dial 25 calibrated to read torque directly in appropriate units. Other voltage measuring circuits known to those skilled in the art will also give good results; the electrical circuits described are merely illustrative of means which may be used. For example, coils 12 may be omitted, and coils 13 and 14 differentially connected in a conventional A.-C. bridge circuit responsive to differential changes in the inductive reactance of these two sets of coils. In this case, it is especially desirable that the coils have a high "Q" and a large inductive reactance compared to the resistance between slip rings 15 and 17 and their associated brushes, since resistance variations then have little effect upon the total impedance.

It is desirable to provide a relatively large number of pole piece groups, each comprising three stator poles cooperating with one rotor pole in the manner described, because the sensitivity to a given angle of twist is directly proportional to such number. Also, it is desirable to have an even number of such groups because then one group will always be diametrically opposite another group, and it will be possible to always exactly compensate for small radial displacement errors. It is also possible to have the groups of three pole pieces on the inner gaging member and the single unwound pole on the outer gaging member without changing the operating principles of the invention.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

Apparatus for measuring the torque of shafts comprising a shaft section containing an axial bore and adapted to transmit the torque to be measured and to twist in proportion to such torque, said shaft section having an integral longitudinally extending torque-transmitting portion of reduced cross-sectional area within which the greater part of such twist occurs, connections at respective ends of said shaft section beyond the extremities of said portion for transmitting torque through the shaft, a reference pin extending axially through said bore, secured to said shaft section at one end thereof beyond the extremity of said portion and rotatively supported within the bore by a bearing at the other end, and a twist measuring device comprising a magnetic rotor fastened to said reference pin at the bearing supported end and a magnetic stator fastened to said shaft section beyond the extremity of said portion in a position to operate in cooperative magnetic flux linking relation with said rotor, said magnetic stator being provided with a plurality of salient pole pieces in groups of three, the center pole piece of each such group of three being provided with a primary coil energized from a source of alternating electric power, the remaining pole pieces being provided with secondary coils in which voltages are induced by magnetic flux linkage with said primary coils, said magnetic rotor being provided with a plurality of salient pole pieces, one for each group of three pole pieces in the stator, so arranged that any rotational displacement of the rotor relative to the stator will change the relative magnitudes of the voltages induced in the secondary coils of each stator pole group, and means for measuring the difference in magnitude between the voltages so induced.

HANS P. KUEHNI.

REFERENCES CITED

The following references are of record in the file of this patent:

UNITED STATES PATENTS

| Number | Name | Date |
| --- | --- | --- |
| 839,803 | Amsler | Jan. 1, 1907 |
| 1,227,043 | Cummings | May 22, 1917 |
| 1,921,983 | Wittkuhns | Aug. 8, 1933 |
| 2,173,039 | Muir | Sept. 12, 1939 |
| 2,329,121 | Lamberger et al. | Sept. 7, 1943 |
| 2,407,657 | Esval | Sept. 17, 1946 |
| 2,443,661 | Lenehan | June 22, 1948 |
| 2,445,427 | Godsey | July 20, 1948 |